(12) United States Patent
Mere et al.

(10) Patent No.: US 10,514,756 B2
(45) Date of Patent: Dec. 24, 2019

(54) ADJUSTING AN ELECTRONIC DISPLAY BASED ON GAZE TRACKING

(71) Applicant: Visteon Global Technologies, Inc., Van Buren Township, MI (US)

(72) Inventors: Shadi Mere, Ann Arbor, MI (US); Paul Fredrick Luther Weindorf, Novi, MI (US); Paul O. Morris, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 158 days.

(21) Appl. No.: 15/587,650

(22) Filed: May 5, 2017

(65) Prior Publication Data

US 2017/0322625 A1 Nov. 9, 2017

Related U.S. Application Data

(60) Provisional application No. 62/332,902, filed on May 6, 2016.

(51) Int. Cl.
*G06F 3/01* (2006.01)
*G09G 5/10* (2006.01)

(52) U.S. Cl.
CPC ........... *G06F 3/013* (2013.01); *G09G 5/10* (2013.01); *G09G 2320/0261* (2013.01); *G09G 2354/00* (2013.01); *G09G 2360/144* (2013.01)

(58) Field of Classification Search
CPC .. G06F 3/013; G09G 5/10; G09G 2320/0216; G09G 2354/00; G09G 2360/144
See application file for complete search history.

(56) References Cited

U.S. PATENT DOCUMENTS

| | | | | |
|---|---|---|---|---|
| 6,762,741 B2 * | 7/2004 | Weindorf | ................. | G09G 3/20 345/102 |
| 2008/0117323 A1 * | 5/2008 | Sakamoto | ............... | G06F 3/011 348/333.01 |
| 2009/0141324 A1 * | 6/2009 | Mukawa | .............. | G02B 5/1814 359/13 |
| 2011/0199202 A1 * | 8/2011 | De Mers | .................. | A61B 5/18 340/439 |
| 2014/0267034 A1 * | 9/2014 | Krulce | .................... | G06F 3/013 345/158 |
| 2015/0002554 A1 * | 1/2015 | Kupershmidt | ....... | G09G 3/3208 345/690 |
| 2015/0168716 A1 * | 6/2015 | Gotoda | .................. | G02B 27/01 345/156 |
| 2015/0269907 A1 * | 9/2015 | Hadas | .................... | G09G 5/363 345/589 |
| 2016/0034032 A1 * | 2/2016 | Jeong | ...................... | G06F 3/013 345/156 |
| 2016/0104454 A1 * | 4/2016 | Huang | .................... | G09G 5/10 345/156 |

(Continued)

*Primary Examiner* — Benyam Ketema
(74) *Attorney, Agent, or Firm* — Quinn IP Law (57) ABSTRACT

Disclosed herein are systems, methods, and devices for employing gaze tracking systems with automatic luminance adjustment devices, in particular those commonly used with the Silverstein-method. By employing the aspects disclosed herein, it can been seen that with the disclosed concepts a pupil-size detector may be employed with both a forward looking light sensor, and ambient light sensor, and an adjustment system to utilize the data to determine luminance adjustment.

8 Claims, 12 Drawing Sheets

(56) References Cited

U.S. PATENT DOCUMENTS

2016/0157324 A1* 6/2016 Weindorf ........... G02B 27/0101
                                                    315/155
2016/0231573 A1* 8/2016 Mullins .............. H05B 37/0218
2017/0047046 A1* 2/2017 Tam .......................... G09G 5/10
2017/0178375 A1* 6/2017 Benishti ............... G06K 9/0061

* cited by examiner

PUPIL RISE TIME EXAMPLE

| t | D | S | A | π | D_F |
|---|---|---|---|---|---|
| 0 | 2 | | | | |
| 0.1 | 2.039801 | 0.398007 | | | |
| 0.2 | 2.079205 | 0.394046 | -0.396 | 9.950083 | 6 |
| 0.3 | 2.118218 | 0.390126 | -0.03921 | 9.950083 | 6 |
| 0.4 | 2.156842 | 0.386244 | -0.03882 | 9.950083 | 6 |
| 0.5 | 2.195082 | 0.382401 | -0.03843 | 9.950083 | 6 |
| 0.6 | 2.232942 | 0.378596 | -0.03805 | 9.950083 | 6 |
| 0.7 | 2.270425 | 0.374829 | -0.03767 | 9.950083 | 6 |
| 0.8 | 2.307535 | 0.371099 | -0.0373 | 9.950083 | 6 |
| 0.9 | 2.344275 | 0.367406 | -0.03692 | 9.950083 | 6 |
| 1 | 2.38065 | 0.363751 | -0.03656 | 9.950083 | 6 |
| 1.1 | 2.416663 | 0.360131 | -0.03619 | 9.950083 | 6 |
| 1.2 | 2.452318 | 0.356548 | -0.03583 | 9.950083 | 6 |
| 1.3 | 2.487618 | 0.353 | -0.03548 | 9.950083 | 6 |
| 1.4 | 2.522567 | 0.349488 | -0.03512 | 9.950083 | 6 |

ADJUSTING AN ELECTRONIC DISPLAY BASED ON GAZE TRACKING

CROSS-REFERENCE TO RELATED APPLICATION

This patent application claims priority to U.S. Provisional Patent Application No. 62/332,902, filed May 6, 2016, entitled "ADJUSTING AN ELECTRONIC DISPLAY BASED ON GAZE TRACKING," now pending. This patent application contains the entire Detailed Description of U.S. Patent Application No. 62/332,902.

BACKGROUND

Electronic displays facilitate the reproduction of data on a lighted platform. Driving circuitry is employed to manipulate lighted elements to render the information being displayed. The viewer may gaze upon the display and view the lighted elements to process and consume the information.

However, because light is employed to convey the electronic information, the viewing experience is affected by the environment in which the electronic display is implemented in. For example, if the electronic display is an awkward or inconvenient location, viewing the electronic display may be ultimately frustrated.

Further, the environment around the electronic display may be dynamic and changing. For example, if the electronic display is implemented in an area that interacts with outside or external light providing sources, the electronic display's ability to convey information via the lighted elements may be obstructed or modified.

A measure of unit for determining the intensity of light being transmitted or propagated in a specific direction is known as luminance. Various units may be employed to measure luminance, such as a candela per square meter. One of ordinary skill in the art may appreciate that several units or types of measurements may be employed for luminance measurement.

For example, if an electronic display is implemented in a vehicle, the electronic display may interact with the outside lighting environment. Thus, several factors may be present with the exterior lighting to affect the display's ability to provide a clear display in an optimal fashion. For example, the exterior lighting may be affected by the cloud cover, the weather, the road (e.g. if the vehicle is in a tunnel), the time of day, or the like.

Thus, an electronic display may be aided greatly by an ability to be cognizant of the exterior lighting conditions. Based on the knowledge of the exterior lighting conditions, the electronic display may adjust the display luminance accordingly.

An interface allows engagement with an electronic system coupled to the electronic display. A detection of an input from the interface may cause an action via the electronic system, which is subsequently shown on the electronic display. Interfaces have become more complex as well. Conventionally, interfaces were implemented with physical input devices, such as a keyboard, manual knob, or the like.

In modern implementations, the interface devices have become more robust and non-contact based. For example, an interface device may allow engagement via a tracking technique facilitated by a monitoring device (such as a camera, a video capturing device, a motion detector, or the like).

One such implementation is a gaze tracking device. A gaze tracking device employs a camera that captures a person's eye (or eyes), and allows for detection of eye movement to control various elements of an electronic display. For example, in one instance, if a detection is made that a person's eyes are focused on a specific area of the electronic display, the electronic display may zoom in or out accordingly.

Thus, electronic displays, systems, and the like, are being implemented along with gaze tracking devices to facilitate control and interactivity. For example, a gaze tracking system may be implemented in a vehicle by installing a camera in an area where the person interacting with the electronic display or system stares at while interacting with the electronic display or system. In the vehicle context, the camera may be mounted in a dashboard, a vehicle's roof, or anywhere capable of capturing the gaze of a user.

Electronic displays have recently been implemented with ambient sensors. Ambient sensors detect the light around the electronic display, and specifically the light emanating in a direction projected towards the viewer of the display. Thus, by being cognizant of the ambient light, the display may be able to adjust and/or compensate for said ambient light.

Figure 1A:
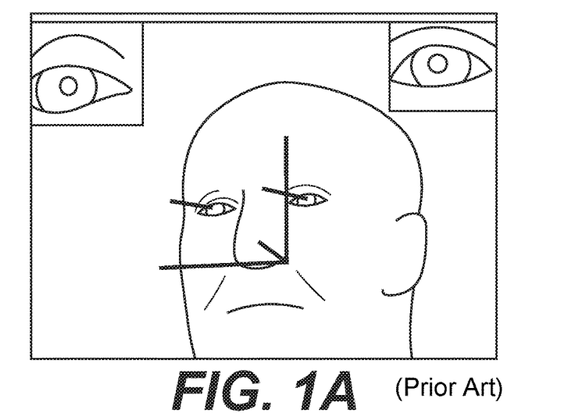
FIGS. 1(a)-(d) illustrate examples of pupil dilation, and pupil measurement according to prior art implementations.
Figure 1B:
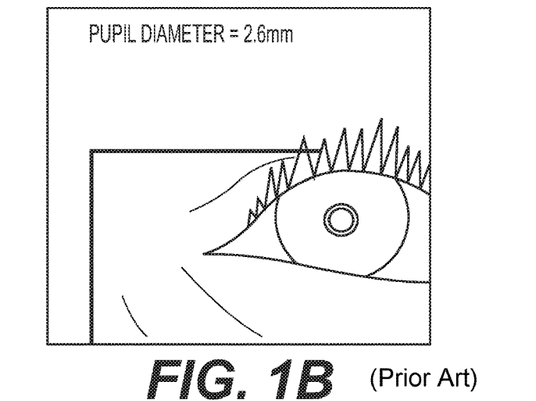
Figure 1C:
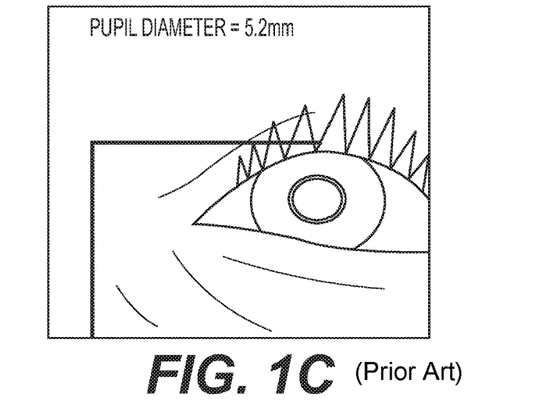
Figure 1D:
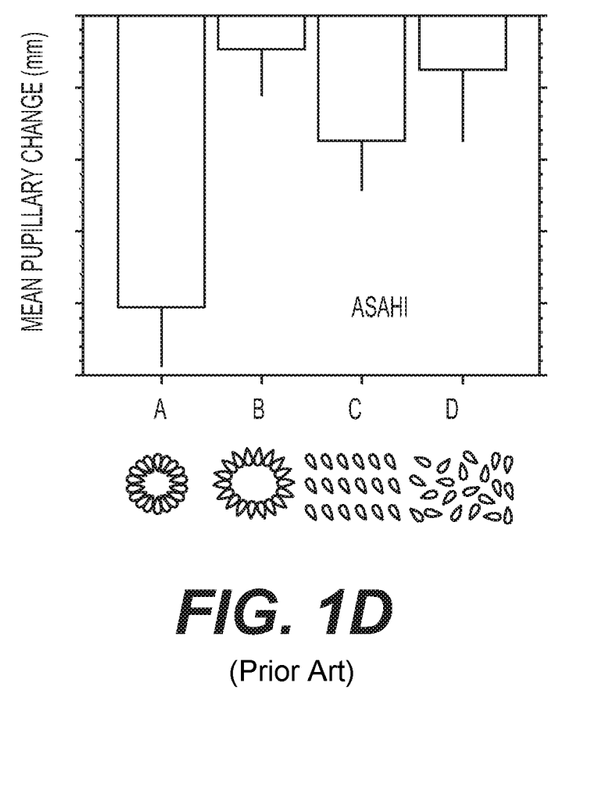

Also important for the aspects disclosed herein is the concept of pupil dilation. As shown in FIGS. 1(a)-(d), pupil dilation may be measured by a provided gaze tracking camera (for example, a camera implemented in a vehicular context). Based on the light hitting the pupil (which is shown in FIG. 1(d)), the pupil diameter changes.

The change in pupil diameter based on light may be affected by other characteristics, such as age, eye color, whether a person wears glasses, drug interactions, or the like. Furthermore, the pupil diameter is affected by the ambient light already in the environment.

SUMMARY

The following description relates to systems, methods, and devices for adjusting an electronic display based on gaze tracking.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Electronic displays employ lighting to convey information to a viewer. As explained in the Background section, the lighting is often interfered with due to environmental conditions, such as ambient light or weather conditions. In these situations, the viewing experience may be affected by the environmental conditions, and thus, be perturbed.

Various techniques have been disclosed that allow the lighting to be adjusted. However, these techniques are either limited by the ranges or the dynamic abilities they provide.

In one such implementation, ambient light is detected, and the display is modified or adjusted accordingly. With these sensors, which may be situated on the electronic display, the light affecting the electronic display is employed to modify or adjust the display.

In another example, a pupil size is measured to replicate or act like a forward looking light sensor. Thus, because the pupil size is used, the light sensing may be more dynamic.

However, the above-mentioned techniques do not involve employing pupil size for the detection of ambient light, and as such, being employed as an ambient light sensor. The aspects disclosed herein propose such systems and methods for providing an automatic biometric luminance control system (for example, in any context where a gaze tracking system is employed, such as automotive applications or cell phones). As such, an electronic display may utilize a viewer's pupil size to automatically adjust a luminance based on detected ambient light sensing.

Figure 2:
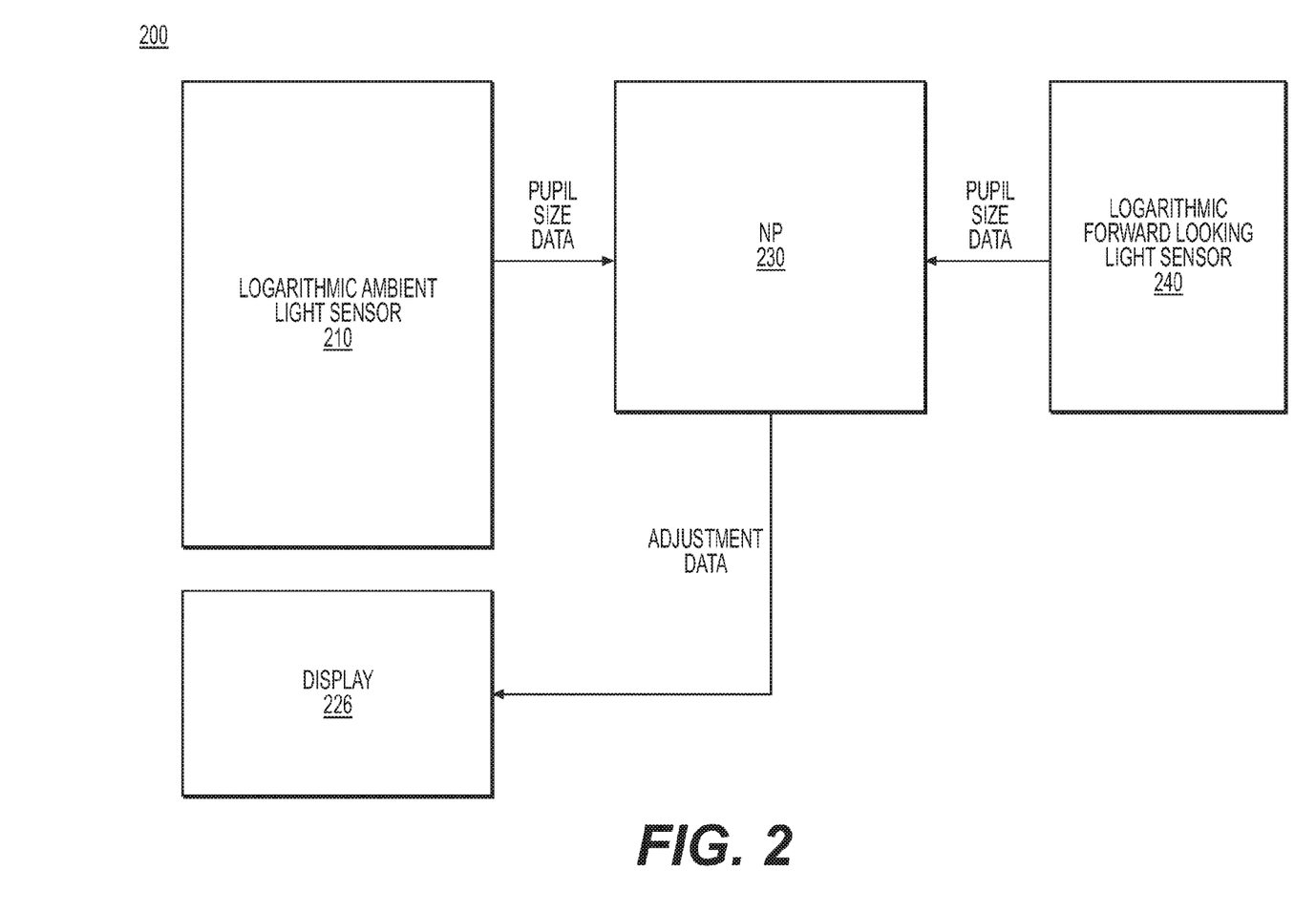
FIG. 2 illustrates a high-level system diagram for implementing the aspects disclosed herein.

FIG. 2 illustrates a high-level system 200 diagram for implementing the aspects disclosed herein. The system 200 includes a logarithmic ambient light sensor 210, a display 220, a microprocessor 230, and a logarithmic forward looking sensor 240.

Figure 3A:
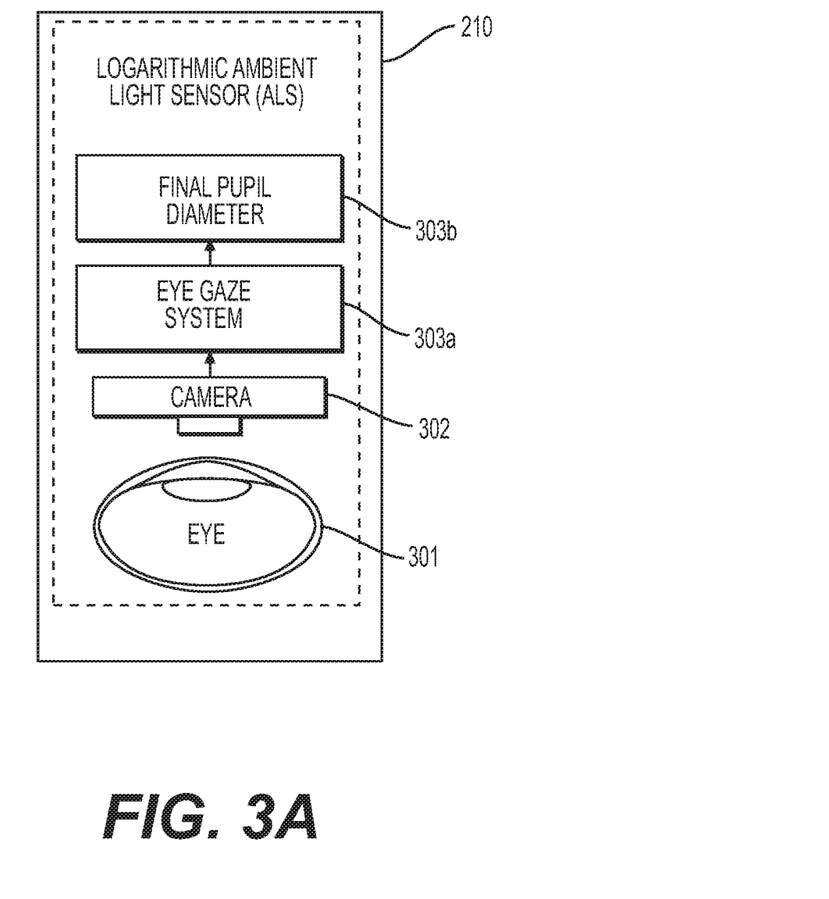
FIGS. 3(a) and (b) illustrate the sensors shown in FIG. 2.
Figure 3B:
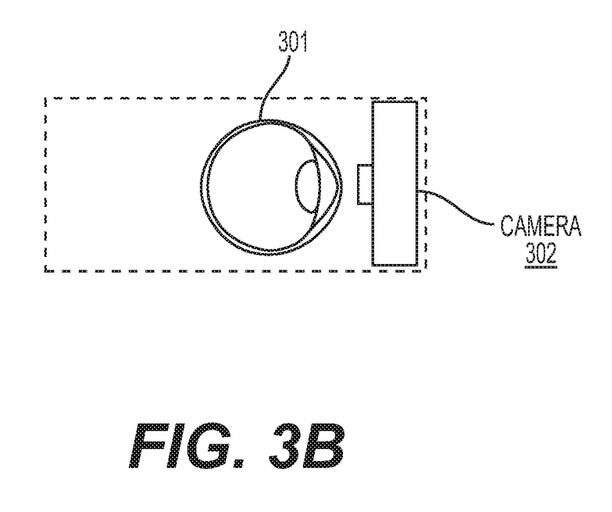

The sensors 210 and 240 are described in detail in FIGS. 3(a) and (b), respectively.

The sensors 210 and 240 each record information about a viewer of the display's pupil size. The pupil size data is then electrically communicated to the microprocessor 230 through any electrical medium known to one of ordinary skill in the art.

In turn, the microprocessor 230 (which will be described in greater detail in FIGS. 13 and 14), employs the pupil size data to create an adjustment amount for the display 220.

In FIGS. 3(a) and (b), sensors 210 and 240 are illustrated, respectively. Referring to FIGS. 3(a) and 3(b), a camera 302 captures an image of an eye 301 via an eye gaze system 303a. The data of the captured eye 301 may be processed to obtain a pupil eye size 303b. This pupil eye size 303b is propagated to the microcontroller 230 to perform the aspects described herein.

FIG. 3(b) is illustrated to indicate that the camera 302 may be implemented without an eye gazing system. Accordingly, the image of the eye 301 may be propagated directly to the microcontroller, with the image processing being performed to determine the pupil size being integrated into this system.

The sensor 210 serves as an ambient light sensor, and is meant to replicate the detection of the ambient light around the display 220. The sensor 240 is a forward looking light sensor, and similar to the ambient light sensor, is meant to replicate the detection of light seen by a viewer of the display 220.

In the system 200 shown in FIG. 2, both sensors employ a measurement of a pupil size, with the pupil size being translated via microcontroller 230 to determine a luminance adjustment associated with the display 220.

The two sensors, sensor 210 and 240, are shown separately for illustrative purposes. However, the sensors may incorporate and use the same camera and gaze tracking system for the purposes of obtaining a pupil size measurement.

After pupil size measurements are received, the microcontroller 230 may be employed to modify said size measurements into data associated with the adjustment of luminance. To explain why, the following concepts were employed to discover a correlation between pupil size and ambient light sensing, and specifically the pupil diameter and the forward field of view intensity.

Employing the unified formula from the Stanley Davies formula, the following expression can be derived, where the Log of L (luminance) is a formula based on the D, diameter of the pupil size:

$$\log(L) = f(D)$$

An adaptation of the formula listed above is shown below:

$$D_{SD}(L, a) = 7.75 - 5.75\left[\frac{(La/846)^{0.41}}{(La/846)^{0.41} + 2}\right]$$

As shown above, the formula disclosed provides another variable 'a', which corresponds to the viewing area associated with the luminance (L).

From the above, the concept of corneal flux density is applied. Thus, the following relationship is provided, where D represents the age of the viewer of the display.

$$\log(La) = \left(\frac{1}{0.41}\right)\log\left[\left(\frac{7.75-D}{D-2}\right)2(846)^{0.41}\right]$$

To derive D, the following equation may be used:

$$D_U = D_{SD} + |y - y_0|[0.02132 - 0.009562 D_{SD}]$$

where:
y=age in years
$y_0$=28.58 years
$D_{sd}$=the equation shown above

Manipulating the above equation, the following expression may be obtained:

$$\log(La) = \left(\frac{1}{0.41}\right)\log\left[\frac{\left[\frac{7.75-D}{-0.05279(y-y_0)}\right]2(846)^{0.41}}{D-2-0.0022(y-y_0)}\right]$$

Figure 4:
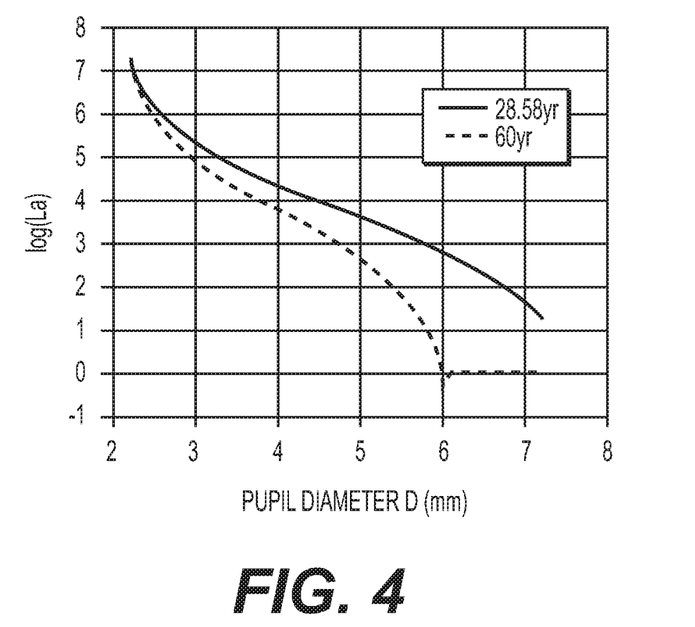
FIG. 4 illustrates a diagram illustrating a relationship between pupil diameters and a Stanley Davies formula corrected for age.

For increased accuracy, knowing the age of the viewer is preferred. As shown in FIG. 4, the relationship between Log(La) and pupil dilation is shown. As shown in FIG. 4, the increased age minimally affects the pupil contraction for high luminance levels, but in a dark environment the aged eye does not dilate as much as a younger eye. The working range for the auto luminance control will be approximately in the 4 mm to 2 mm pupil diameter range corresponding from 10 cd/m² to greater than 10,000 cd/m². If for example the age of the user is not known, the algorithm would resort to the worst case 60 year old eye. Different techniques could be employed to determine the log(La) as a function of the measured camera diameter according to equation shown above, such as a direct calculation, lookup tables or other approximations such as a linear equation approximation or other equation approximations. In the event that the pupil diameter cannot be measured due to squinting (reduced eyelid opening), eye tracker data which provides a percentage of eye closure relative to a nominal level may be also be used to predict a high luminance condition.

In an automotive implementation, a viewer of the display may look out of the front window for longer periods of time, and only momentarily glance at display 220. Thus, according to the aspects disclosed herein, a predictive pupillary response is developed. This is particularly important in an automotive environment where the outside luminance may be much higher than the display plus reflected background luminance. Therefore, since the pupillary response is much slower when adapting to a lower luminance, the glance time may not be sufficient to elicit a steady state condition.

Figure 5:
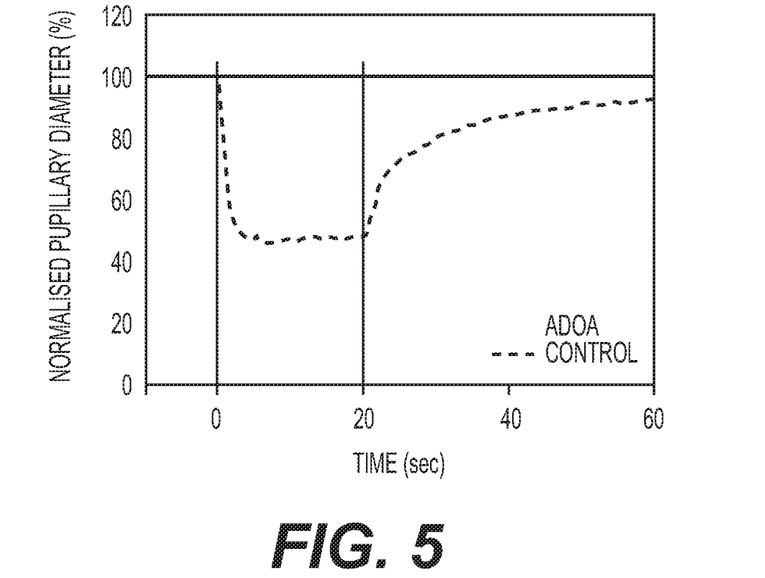
FIG. 5 illustrates an example of a pupil response versus time.

As shown in FIG. 5, an example of pupil response times is shown. Note that the response times are approximately exponential in nature and the response to dimmer condition is much slower than a brighter condition.

Figure 6:
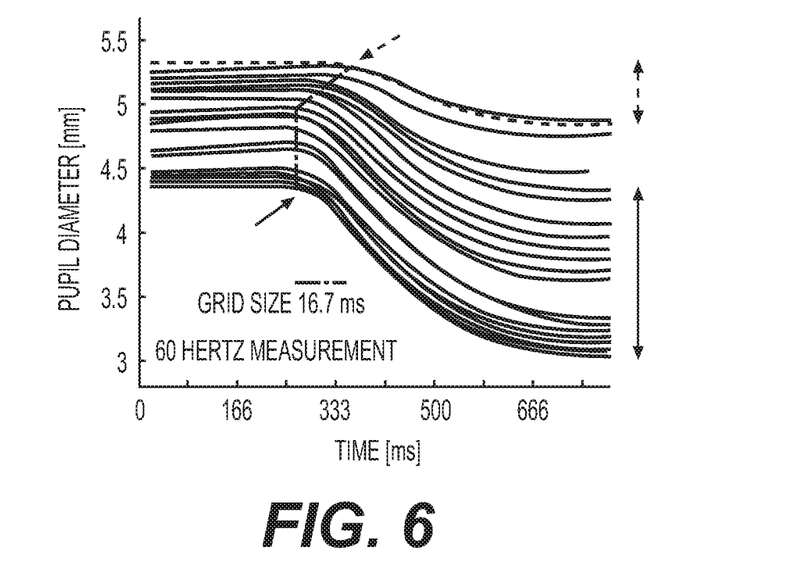
FIG. 6 illustrates a relationship between latency and pupil diameters.

Another effect to consider is latency. As shown in FIG. 6, it is preferred that measurements be used after 400 ms.

Figure 7:
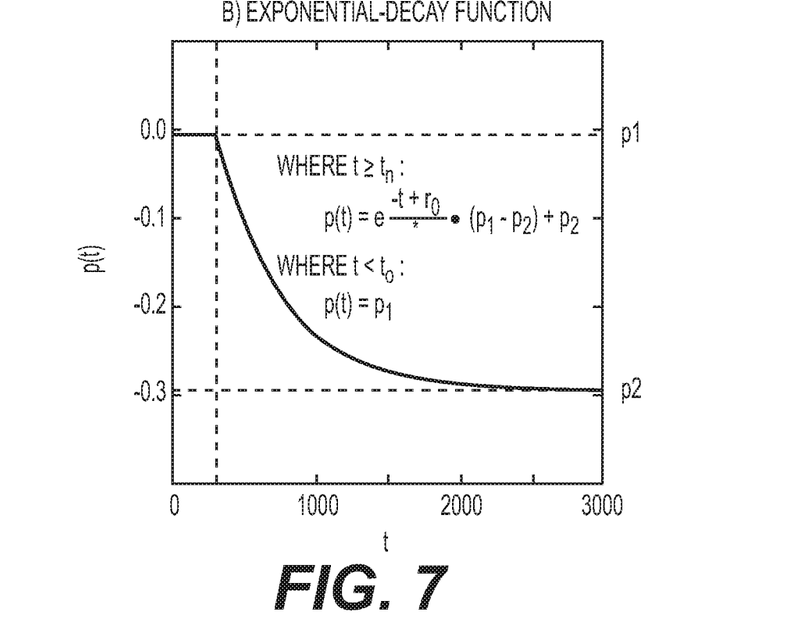
FIGS. 7 and 8 illustrate the effects of an exponential decay function on the constants derived herein.

To deal with exponential response, the following equation may be employed:

$$D = (D_I - D_F)e^{-t/\tau} + D_F$$

where:
D=Pupil Diameter
$D_I$=Initial Pupil Diameter
$D_F$=Final Pupil Diameter (steady state)
τ=Response Time Constant The exponential-decay function described above is shown in FIG. 7.

Referring back to FIG. 5, the falling figures may be employed:
$\tau_{Fall} \approx 1$ second
$\tau_{Rise} \approx 10$ seconds The above equation may be simplified in the following way:

$$D = De^{-t/\tau} + D_F$$

In order to find the time constant to be used, a derivative of the above-equation may be taken, to produce the following relationship:

$$S = \frac{dD}{dt} = -\left(\frac{1}{t}\right)De^{-t/t}$$

Next, the acceleration A of the pupil change may be obtained by the measurements taking dynamically, and taking the derivative of the above equation.

$$A = \frac{dD^2}{dt^2} = \frac{D}{t^2}e^{-t/t}$$

Dividing S/A, results in the time constant, as shown in the following relationship:

$$t = -\frac{S}{A}$$

In order to determine the initial to final value delta, the S relationship is squared:

$$S^2 = \frac{D^2}{t^2}e^{-2t/t}$$

And dividing the above by the A factor, produces the following relationship:

$$\frac{S^2}{A} = De^{-t/t}$$

Solving for the delta, produces:

$$D = \frac{S^2}{A}e^{t/t}$$

And substituting the time constant into the above relationship produces the following:

$$D = \frac{S^2}{A}e^{-tA/S}$$

Thus, using the delta above in the relationship for D above produces the predicted pupil diameter:

$$D_F = D - De^{-t/t}$$

Further solving the above equation, produces:

$$D_F = D - \frac{S^2}{A} e^{t/t} e^{-t/T}$$

And due to the fact that exponents of the base e add to zero, the above relationship can be simplified further:

$$D_F = D - \frac{S^2}{A}$$

Thus, the above relationship allows for determining the predictive pupil diameter by measuring the time stamped pupil diameters and determining the instantaneous slope and acceleration at each time stamp from which the final steady state pupil diameter may be calculated and predicted.

Figure 8:
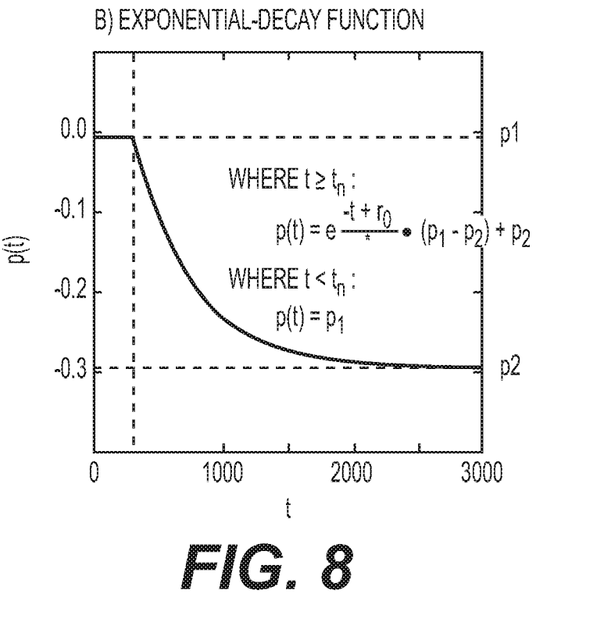
Figure 9:
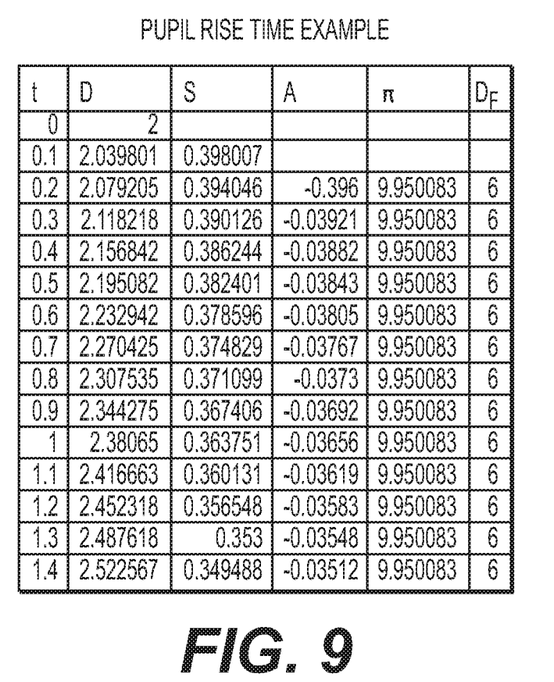
FIG. 9 illustrates a table for correlating pupil diameters with ascertained time stamps.

As shown in FIG. 8, the pupil diameter may be determined by either a rising or falling slope value. Based on the example time stamps and associated pupil diameters provided in FIG. 9, the slope and acceleration values may be determined based on knowing the measured diameter and the time. FIG. 9 shows that no matter where you are in time, the final steady state value (in this case Df=6 mm) may be determined by calculating the slope and acceleration at any of the time stamps by using Equation above. Please note that the diameters in the second column are increasing exponentially in size and would eventually end at 6 mm as predicted by the equation above. For example in this case the diameters in the second column were calculated from the exponential equation D=$-4e^{-t/10}+6$. Please note that the 6 in the exponential equation is the final value as predicted by the instantaneous calculations at each time. The final predicted value is what allows one to determine the reflected luminance from the screen.

Specifically, to determine the values shown in FIG. 9, the following relationships may be employed:

$$S = \frac{D(t) - D(t - 0.1)}{0.1}$$

$$A = \frac{S(t) - S(t - 0.1)}{0.1}$$

Figure 10:
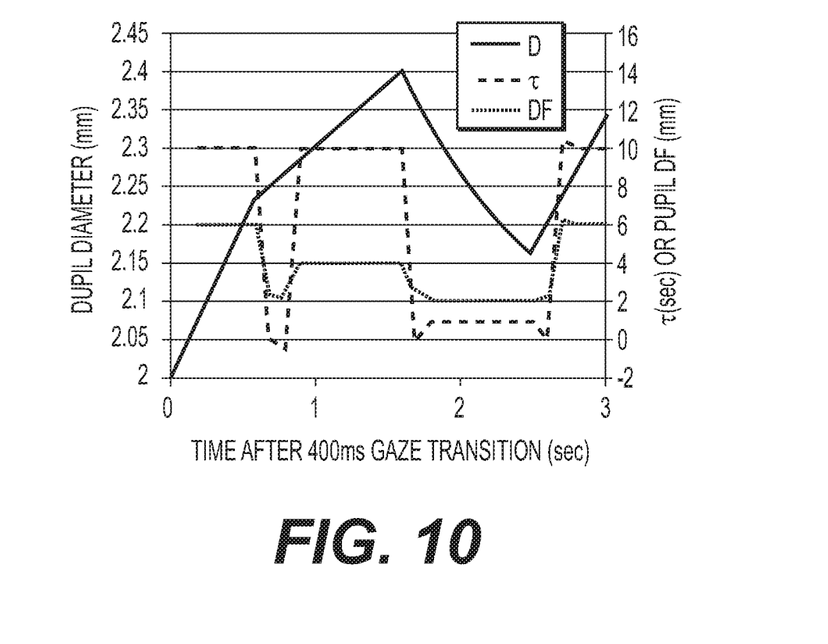
FIG. 10 illustrates how a final pupil diameter is selected for a 3 second gaze time.

FIG. 10 illustrates how a final pupil diameter is selected for a 3 second gaze time. Once the final steady state pupil diameter is determined, the determination of Log(La) value may be performed. Further, compensating for the fact that the viewer sees luminance from both the background and the display, the following relationship may be rewritten:

$$\log(La) = \log((L_D + L_{BG})a)$$

The above relationship could be simplified to the following:

$$\log(La) \gg \log(L_{BG}a)$$

As shown, the term of $L_D$ is ignored, as it may be assumed to be significantly lower than $L_{BG}$. And further rewritten as the following:

$$La \gg L_{BG}a$$

In order to determine a usable 'a' value for the above expression, the following approximations may be made. Assuming an 8" diagonal display viewed at a distance of 30 cm with a cone with an apex angle of 2Θ, the angle can be approximated:

$$Q = a\tan\left(\frac{4 \cdot 25.4}{300}\right) = 0.327 \text{ radians}$$

Further, the solid angle of a cone is defined by:

$$w = 2p(1 - \cos Q)sr$$

The above relationship may utilize the following relationship to transform the value into square degrees:

$$1 sr = \left(\frac{180}{p}\right)^2 \text{square\_degrees}$$

$$W = a = 2p(1 - \cos Q)\left(\frac{180}{p}\right)^2 deg^2$$

Thus, using the 8" display may be used to determine the angle:

$$W = 2p(1 - \cos(.327))\left(\frac{180}{p}\right)^2 deg^2 = 1090 \, deg^2$$

Thus, using the above, the following revised relationship can be provided:

$$L_{BG} = \left[\frac{7.75 - D}{D - 2}\right]^{1/0.41} \cdot 2^{1/0.41} \cdot \frac{846}{a}$$

Figure 11:
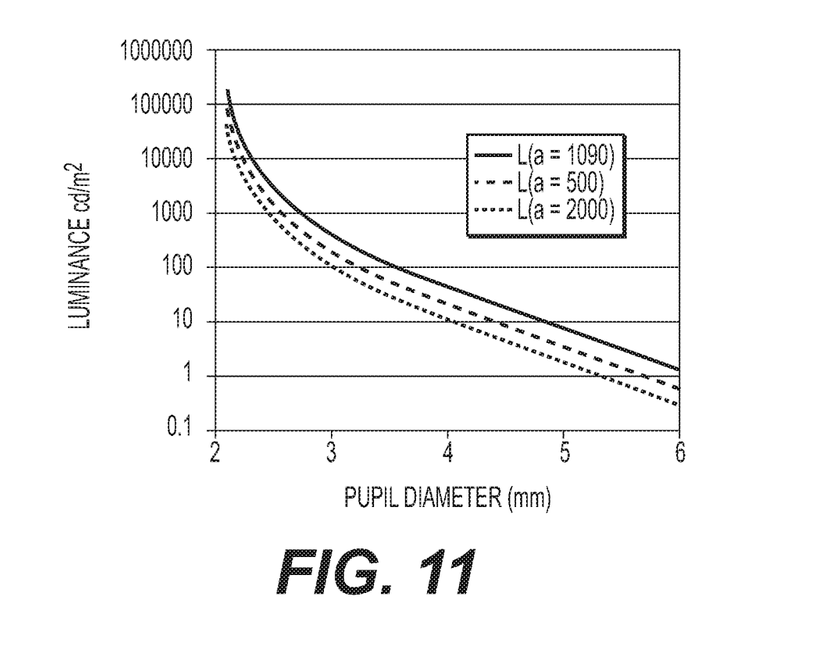
FIG. 11 illustrates that using pupil size is an effective replacement to a standard logarithmic ambient light sensor.

Substituting the value of a derived above is shown in the graph of FIG. 11. The graph shown in FIG. 11 illustrates that using pupil size is an effective replacement to a standard logarithmic ambient light sensor.

Figure 12:
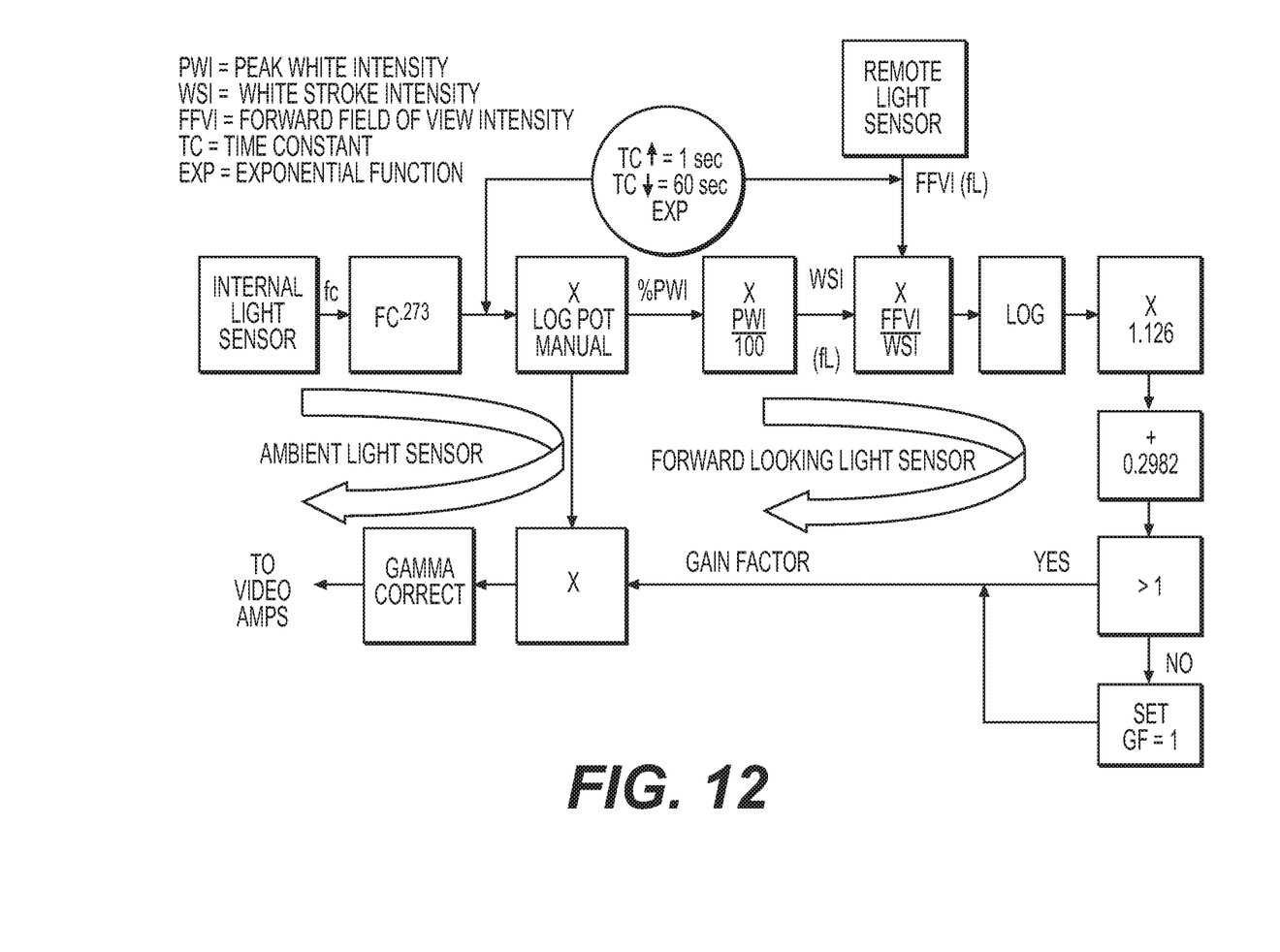
FIG. 12 is an explanation of using logarithmic data with the Silverstein model.

The pupil size-based ambient light sensor may be incorporated into the basic Silverstein model shown in FIG. 12.

The ambient light sensor is characterized by the following relationship:

$$ESL = B_O (D \, BL)^C \text{ where:}$$

ESL=Emitted Symbol Luminance in cd/m$^2$ $B_O$=Luminance Offset Constant

DBL=Display Background Luminance in cd/m$^2$ proportional to the display ambient light sensor value c=Power Constant (This is the slope of the power function in logarithmic coordinates)

Figure 13:
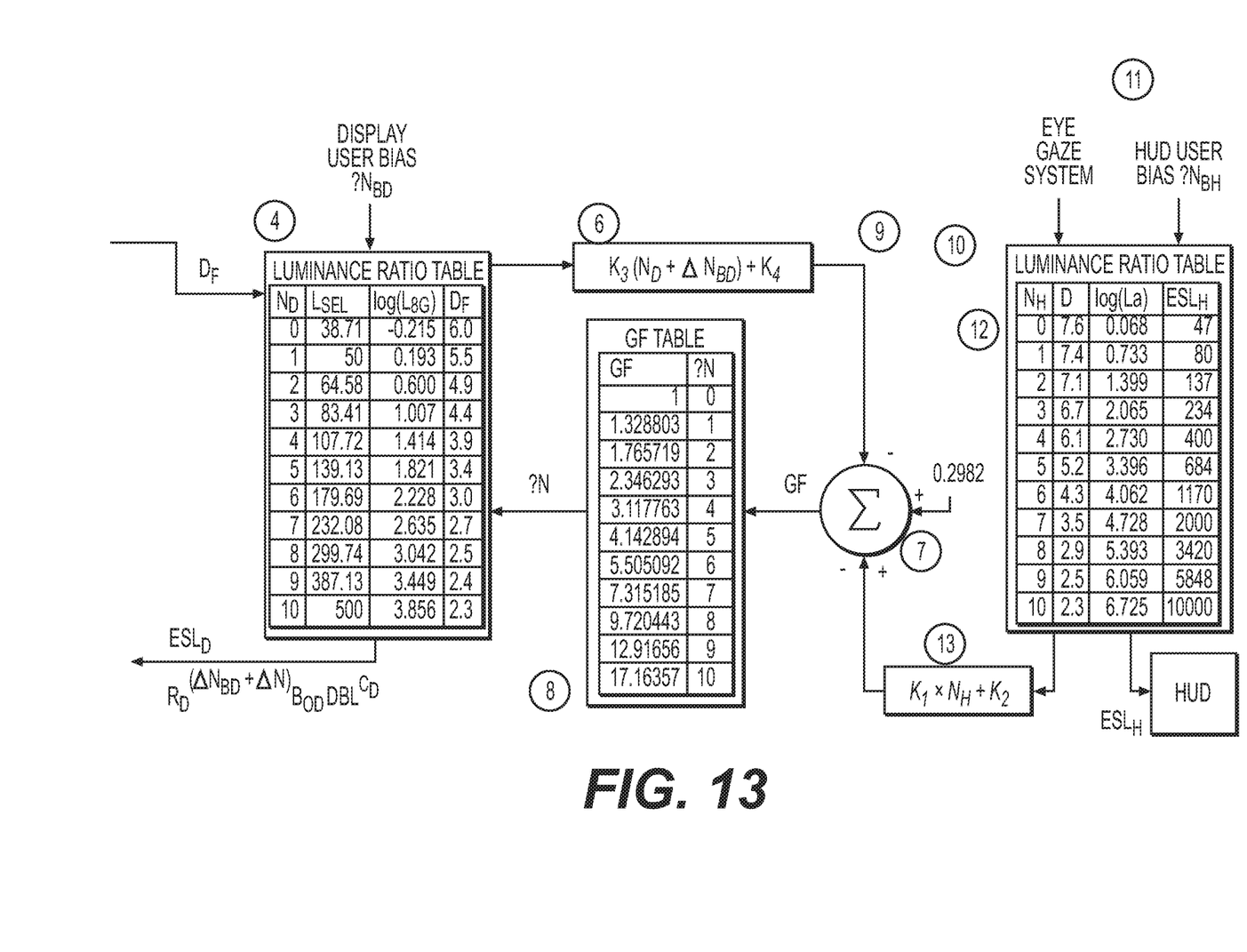
FIG. 13 illustrates the operations associated with the microcontroller in FIG. 2.

FIG. 13 illustrates an example flow-chart describing the series of operations employed for microcontroller 230. The microcontroller 230 as shown, implements various Luminance Ratio Tables (LRT). Once the pupil size is obtained, employing the LRT's shown, as well as the operations described above, the display 220 may be adjusted in the electrical coupling relationship shown in FIG. 2.

Figure 14:
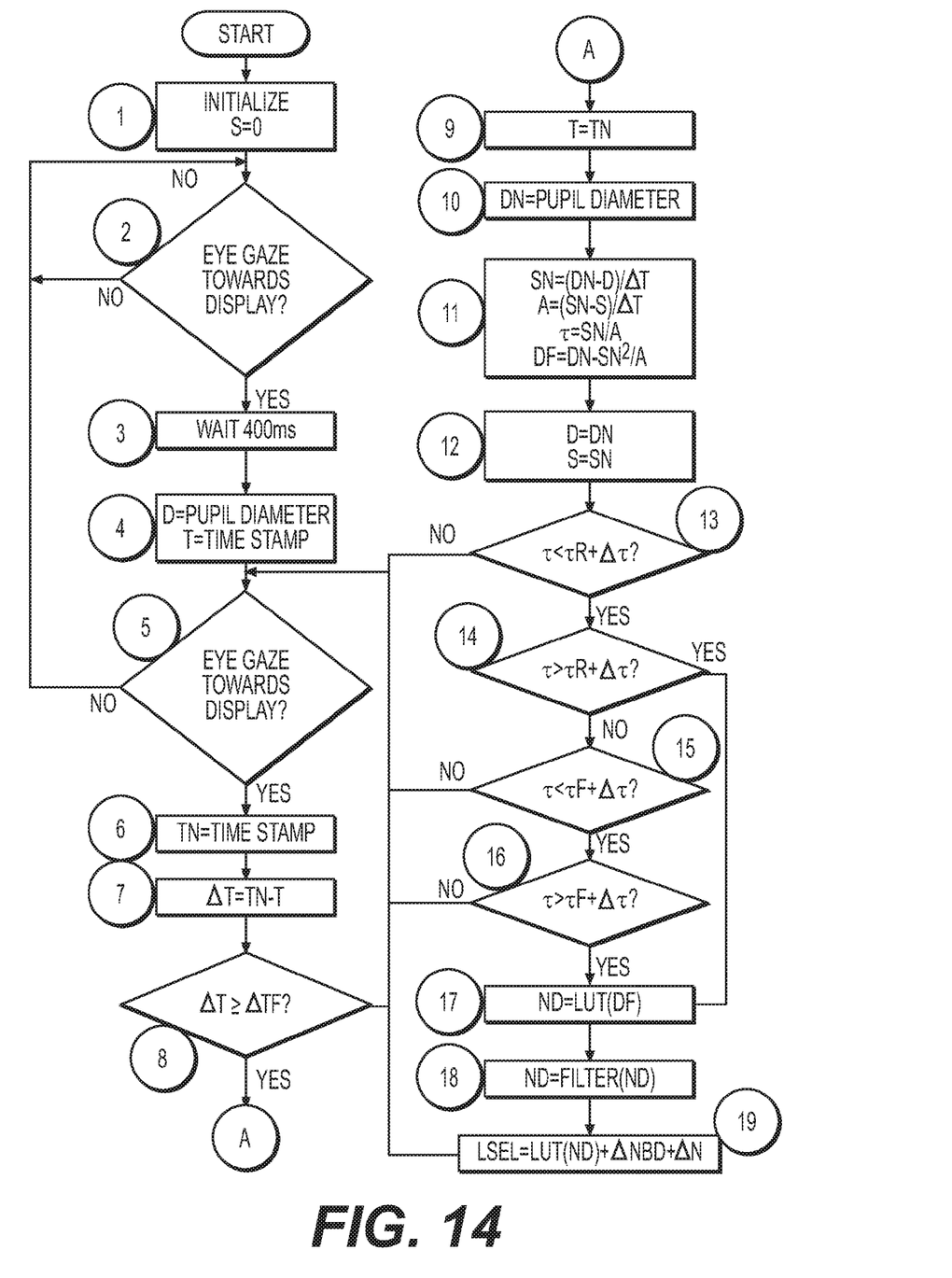
FIG. 14 illustrates a flowchart explaining the operations in FIG. 13.

FIG. 14 illustrates an implementation of the microcontroller 230 as shown in a flowchart topology. The following steps are laid out as such:

Block 1—Initialization

In order to go through the first calculation, the slope S is initialized to zero.

Block 2—Eye Gaze Determination

This step determines if the user is "gazing" at the display of interest (DOI) to determine the reflected background luminance.

Block 3—Pupil Latency Delay

Once it has been determined that the subject is viewing the DOI, this step waits 400 ms to ensure that the pupil latency time has been exceeded and has entered into the dynamic response period.

Block 4—Measure Pupil Diameter and Time Stamp

This step measures and records the pupil diameter and the associated time stamp.

Block 5—Eye Gaze Determination

This step determines if the user is still "gazing" at the display of interest (DOI) to determine the reflected background luminance. If the user is no longer gazing at the display, the process must start over.

Block 6—New Time Measurement

The current time is sampled to determine if the next pupil diameter measurement should be made.

Block 7—ΔT Determination

The difference between the current time and the last sample time is calculated to determine is the next sample time has been reached. Note that ΔDF must be an integer value of the loop sample time.

Block 8—Next Sample Time Determination

This step is to determine if the next sample time has been reached.

Block 9—Swap New Time into Old Time

Once the new sample time has been reached the new time is entered into the old time variable to prepare for the next sample time determination.

Block 10—Measure New Pupil Diameter

The new pupil diameter is measured and recorded

Block 11—Calculate Slope, Acceleration, Time Constant and Steady State Pupil Diameter The instantaneous slope, acceleration, time constant and steady state pupil diameter values are calculated per the equations in block 11.

Block 12—Swap New Diameter and Slope into Old Variables

The new diameter and slope values are swapped into the old variables to prepare for the next calculations in block 11.

Blocks 13 through 16—Time Constant Validity Determination

The time constant is evaluated to determine if the steady state value calculated in block 11 is valid. If it is not valid another sample is required.

Block 17—Look Up Table Luminance Step Number Determination

Once a valid steady state pupil diameter is determined, the luminance step number associated with the pupil diameter is determined via a look up table.

Block 18—Step Number Filtering

In this step the step number is filtered to determine the actual step number that should be utilized to determine the actual display luminance value. Filter methods such as those described in reference [11] may be utilized.

Block 19—Look Up Table Display Luminance Determination

The final display luminance value to be commanded is determined via a look up table from the addition of the filtered ambient light sensor step number, the forward looking light sensor delta step number and the user preference offset step number.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for adjusting an electronic display, comprising:
a gaze tracking device operable to capture an image of a pupil associated with a viewer of the electronic display, wherein the gaze tracking device is operable to determine a diameter of the pupil from the image of the pupil, and communicate a signal indicating the diameter of the pupil to a microcontroller;
a logarithmic ambient light sensor operable to detect ambient light around the electronic display and communicate a logarithmic signal to the microcontroller indicating the detected ambient light around the electronic display;
a logarithmic forward looking light sensor operable to detect light viewed by the viewer of the electronic display and communicate a logarithmic signal to the microcontroller indicating the detected light viewed by the viewer; and
wherein the microcontroller is operable to:
adjust a luminance of the electronic display based on a combination of the diameter of the pupil of the viewer, a detected change in a pupil size, the logarithmic signal from the logarithmic ambient light sensor indicating the detected ambient light around the electronic display, and the logarithmic signal from the logarithmic forward looking light sensor indicating the detected light viewed by the viewer;
initialize a slope to zero;
determine if the viewer is oriented at the gaze tracking device, and in response to this;
introduce a pupil latency delay;
measure the diameter of the pupil and record a time stamp of the measurement;
determine if the pupil is still gazing at the gaze tracking device, and in response to this determination being yes, and in response to a predetermined time elapsing, re-measure the diameter of the pupil;
based on an original diameter of the pupil, the re-measured diameter of the pupil, and a change in time, calculating the slope, an acceleration, a time constant and a steady state pupil diameter value;
re-calculate a relationship with the re-measured diameter of the pupil;
determine whether the time constant calculated is correct;
ascertain a luminance step based on the steady state pupil diameter value; and
determine a final luminance based on the luminance step.

2. The system according to claim 1, wherein the microcontroller is operable to transform the logarithmic signals from both the logarithmic forward looking light sensor and the logarithmic ambient light sensor using an analog-to-digital process.

3. The system according to claim 1, wherein the microcontroller is operable to transform the signal indicating the diameter of the pupil from the gaze tracking device using an analog-to-digital process.

4. The system according to claim 1, wherein the microcontroller is operable to transform the signals from the gaze tracking device, the logarithmic ambient light sensor, and the logarithmic forward looking light sensor using a Silverstein model.

5. A system for adjusting an electronic display comprising:
- a gaze tracking device to capture an image of a pupil associated with a viewer of the electronic display, a diameter of the pupil being ascertained via the image of the pupil;
- an ambient light sensor receiver to logarithmically receive light information from an ambient light sensor;
- a forward looking light sensor receiver to logarithmically receive light information from a forward looking light sensor;
- a microcontroller to adjust a luminance of the electronic display based on a combination of the diameter and the light information received from both the ambient light sensor and the forward looking light sensor;
- wherein the light information from both the forward looking light sensor and the ambient light sensor is transformed via an analog-to-digital (A/D) process;
- wherein the microcontroller adjusts the luminance based on a detected change in a pupil size; and
- wherein the change in the pupil size is corrected with the following relationship:

$$D=(D_I-D_F)e^{-T/t}+D_F$$

where:
D=Pupil Diameter
DI=Initial Pupil Diameter
DF=Final Pupil Diameter (steady state)
T=Response Time Constant
t=time change from initial measurement to final measurement.

6. The system according to claim 1, wherein the change in the pupil size is corrected with the following relationship:

$$D=(D_I-D_F)e^{-T/t}+D_F$$

wherein D is the corrected pupil diameter, $D_I$ is the initial pupil diameter, $D_F$ is the steady state final pupil diameter, T is the response time constant, and t is the time change from the initial measurement of pupil diameter to the final measurement of pupil diameter.

7. A system for adjusting an electronic display, the system comprising:
- a gaze tracking device operable to capture an image of a pupil associated with a viewer of the electronic display;
- a logarithmic ambient light sensor operable to detect ambient light around the electronic display;
- a logarithmic forward looking light sensor operable to detect light viewed by the viewer of the electronic display;
- a microcontroller including a processor and a memory having an algorithm stored thereon, wherein the processor is operable to execute the algorithm to:
  - receive the image of the pupil from the gaze tracking device;
  - calculate an original diameter of the pupil;
  - receive a logarithmic signal from the logarithmic ambient light sensor, wherein the logarithmic signal from the logarithmic ambient light sensor indicates an amount of ambient light around the electronic display;
  - receive a logarithmic signal from the logarithmic forward looking light sensor, wherein the logarithmic signal from the logarithmic forward looking light sensor indicates an amount of light viewed by the viewer of the electronic display;
  - detect a change in the diameter of the pupil of the viewer;
  - correct the detected change in the diameter of the pupil of the viewer with the following relationship:

$$D=(D_I-D_F)e^{-T/t}+D_F$$

wherein D is the corrected pupil diameter, $D_I$ is the initial pupil diameter, $D_F$ is the steady state final pupil diameter, T is the response time constant, and t is the time change from the initial measurement of pupil diameter to the final measurement of pupil diameter;
  - determine a final luminance for the electronic display based on the original diameter of the pupil, the logarithmic signal from the logarithmic ambient light sensor indicating the amount of ambient light around the electronic display, and the logarithmic signal from the logarithmic forward looking light sensor indicating the amount of light viewed by the viewer of the electronic display; and
  - adjust the luminance of the electronic display to achieve the final luminance.

8. The system set forth in claim 7, wherein the processor is operable to execute the algorithm to:
- re-calculate the final luminance based on the change in the diameter of the pupil of the viewer; and
- re-adjust the luminance of the electronic display to achieve the re-calculated final luminance.

* * * * *